United States Patent
Hosokawa et al.

(10) Patent No.: US 9,874,134 B2
(45) Date of Patent: Jan. 23, 2018

(54) COOLING WATER CONTROL APPARATUS

(71) Applicant: TOYOTA JIDOSHA KABUSHIKI KAISHA, Toyota-shi, Aichi-ken (JP)

(72) Inventors: Yohei Hosokawa, Susono (JP); Takashi Amano, Susono (JP); Satoru Ito, Susono (JP); Kojiro Hayakawa, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 148 days.

(21) Appl. No.: 14/787,363

(22) PCT Filed: Apr. 30, 2013

(86) PCT No.: PCT/JP2013/062618
§ 371 (c)(1),
(2) Date: Oct. 27, 2015

(87) PCT Pub. No.: WO2014/178111
PCT Pub. Date: Nov. 6, 2014

(65) Prior Publication Data
US 2016/0102601 A1 Apr. 14, 2016

(51) Int. Cl.
*F01P 11/16* (2006.01)
*F01P 11/14* (2006.01)
(Continued)

(52) U.S. Cl.
CPC ............ *F01P 11/16* (2013.01); *F01P 3/20* (2013.01); *F01P 7/14* (2013.01); *F01P 11/14* (2013.01);
(Continued)

(58) Field of Classification Search
CPC ............... F01P 11/16; F01P 3/20; F01P 7/14
See application file for complete search history.

(56) References Cited

U.S. PATENT DOCUMENTS 2,408,269 A * 9/1946 Peterson ............ G05D 23/123
236/34
6,321,697 B1  11/2001 Matsuda et al.
(Continued)

FOREIGN PATENT DOCUMENTS

CN    2065674 U    11/1990
CN    1277928 A    12/2000
(Continued)

OTHER PUBLICATIONS

Office Action issued in U.S. Appl. No. 14/787,502 dated Mar. 24, 2017.
(Continued)

*Primary Examiner* — Kevin A Lathers
(74) *Attorney, Agent, or Firm* — Andrews Kurth Kenyon LLP

(57) ABSTRACT

A cooling water control apparatus is a cooling water control apparatus for controlling a cooling apparatus having a first pipe which circulates cooling water through an engine; a second pipe which circulates the cooling water not through the engine; and a switching valve whose state is changed between opened and closed states, and has: a detecting device which detects first temperature of the cooling water in a pipe portion of the first pipe between the engine and the switching valve; and a determining device which determines that there is failure of the switching valve whose state is the closed state, if required period from the output of the command for changing the state of the switching valve from the opened state to the closed state until the first temperature reaches predetermined temperature is larger than predetermined target period.

3 Claims, 9 Drawing Sheets

(51) Int. Cl.
  *F01P 7/14* (2006.01)
  *F01P 3/20* (2006.01)
  *G01K 13/02* (2006.01)
  *G01M 15/04* (2006.01)

(52) U.S. Cl.
  CPC ........... G01K 13/02 (2013.01); G01M 15/042 (2013.01); *F01P 2007/146* (2013.01); *F01P 2025/52* (2013.01); *F01P 2031/00* (2013.01); *F01P 2060/08* (2013.01); *F01P 2060/16* (2013.01); *G01K 2013/026* (2013.01)

(56) References Cited

U.S. PATENT DOCUMENTS

| | | | | |
|---|---|---|---|---|
| 8,573,163 | B2* | 11/2013 | Kinomura | F01P 7/165 123/41.02 |
| 2007/0290056 | A1 | 12/2007 | Fishman | |
| 2009/0038593 | A1 | 2/2009 | Blumendeller | |
| 2012/0137992 | A1* | 6/2012 | Kinomuka | F01P 7/165 123/41.08 |
| 2016/0061091 | A1 | 3/2016 | Hosokawa | |

FOREIGN PATENT DOCUMENTS

| | | | | |
|---|---|---|---|---|
| CN | 102575569 | A | 7/2012 | |
| EP | 2487346 | A1 | 8/2012 | |
| JP | 2004-232519 | A | 8/2004 | |
| JP | 2007056722 | A | 3/2007 | |
| JP | 2008215183 | A | 9/2008 | |
| JP | 2009180103 | A | 8/2009 | |
| JP | 2011-102545 | A | 5/2011 | |
| JP | 4883225 | B2 | 2/2012 | |
| WO | WO 2011/042942 | A1 * | 4/2011 | ............... F01P 11/14 |

OTHER PUBLICATIONS

USPTO, Notice of Allowance in U.S. Appl. No. 14/787,502 dated Aug. 30, 2017, 9 pages.

* cited by examiner

[FIG. 1]
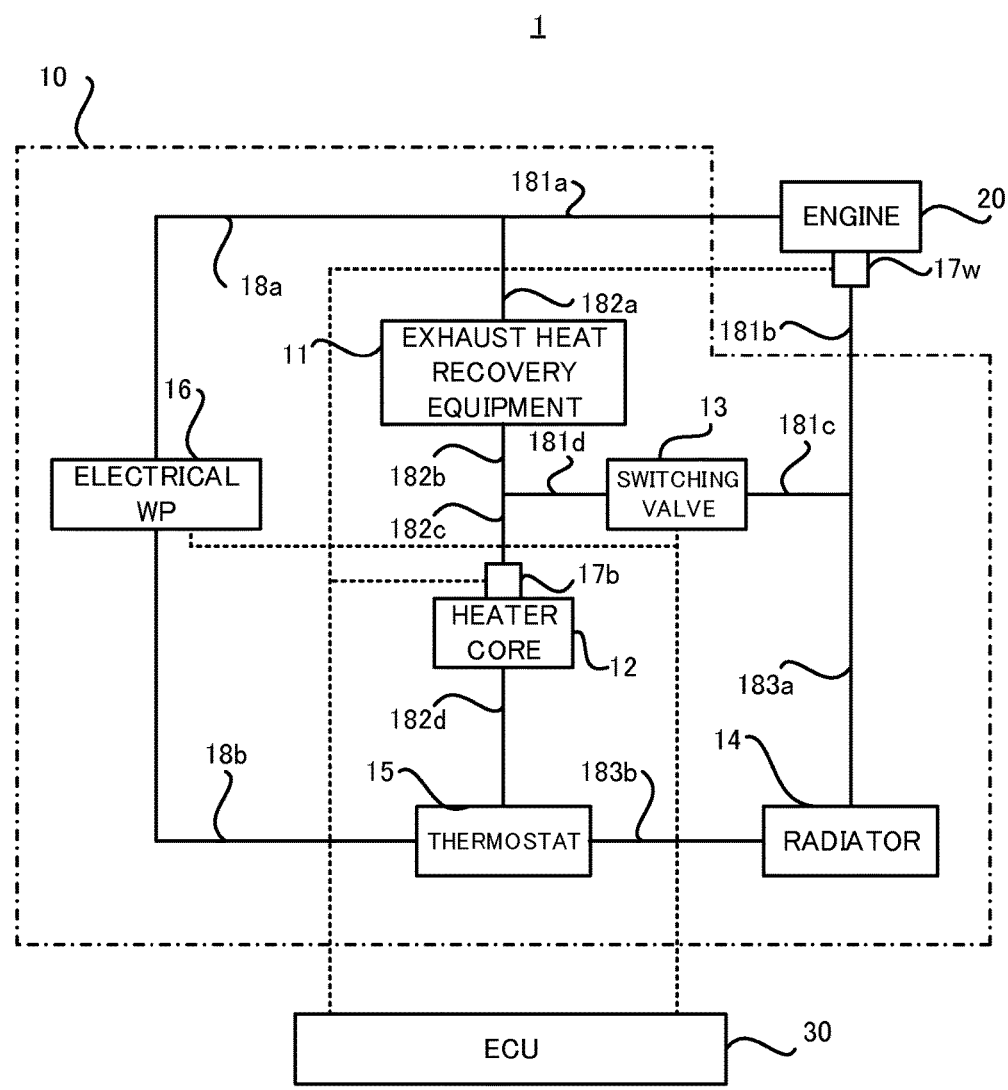

[FIG. 3]
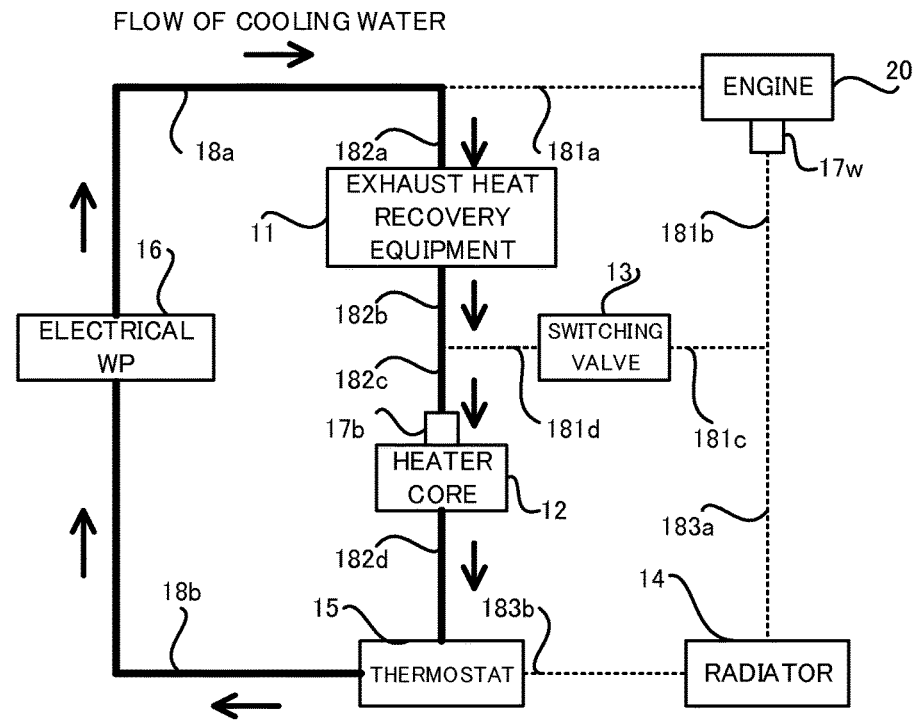
[FIG. 4]
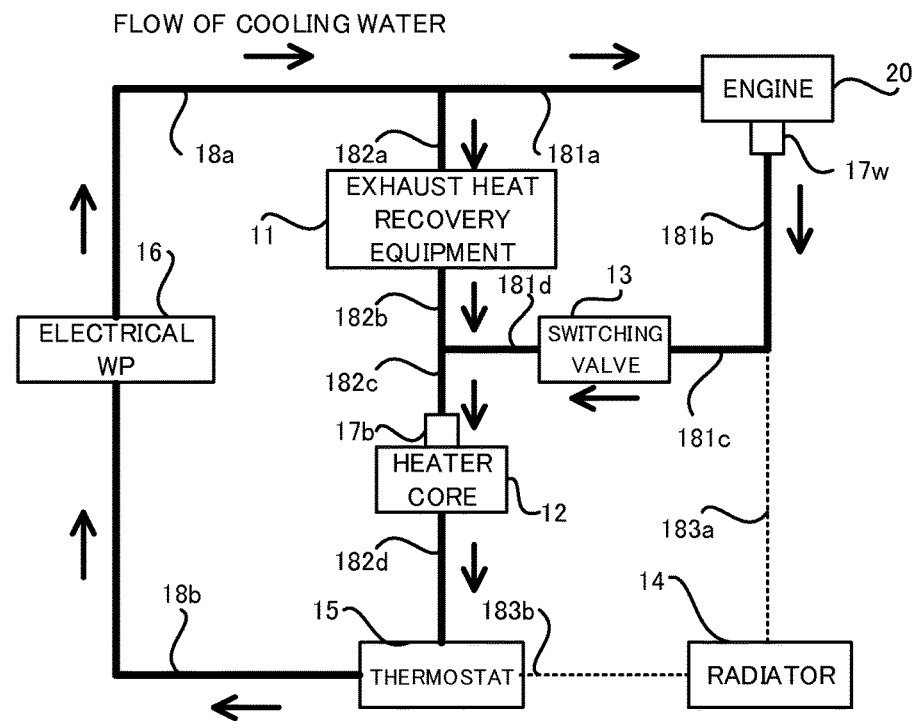

[FIG. 5]
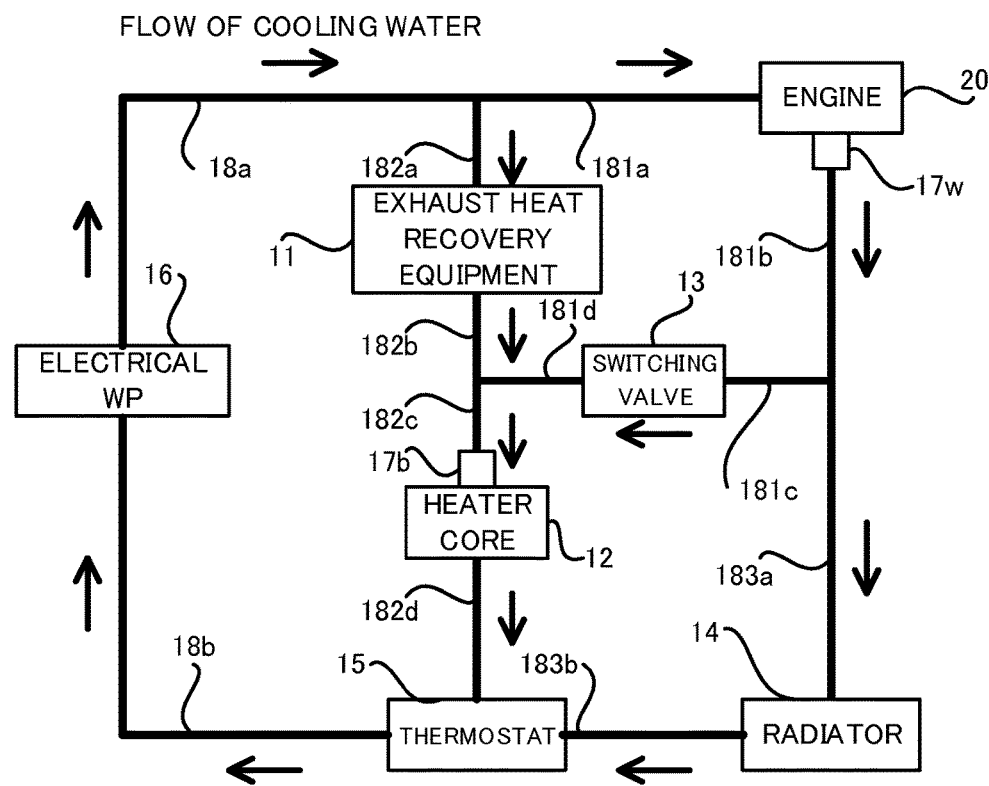

[FIG. 7]
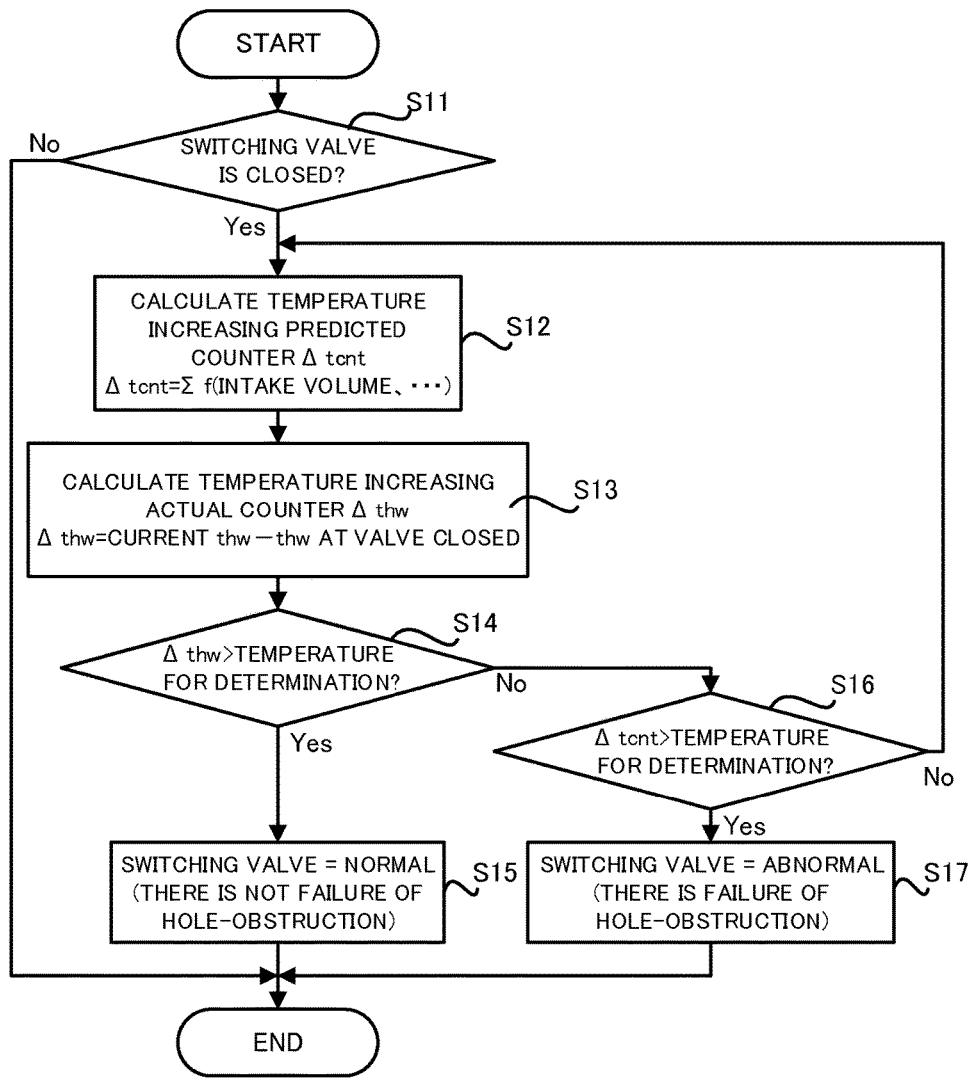

[FIG. 8]
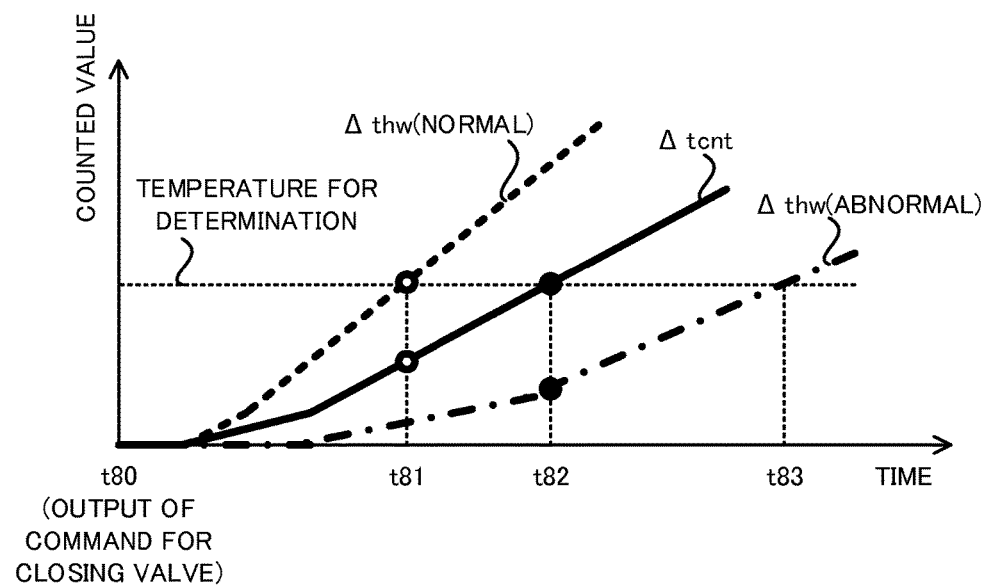

[FIG. 9]
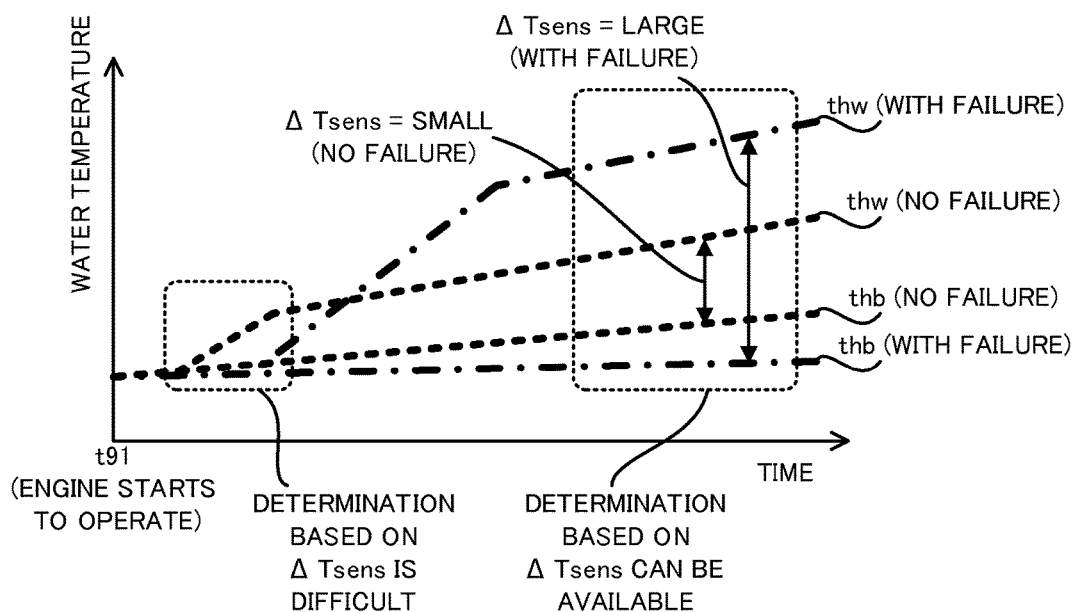
[FIG. 10]
|  | PREDETERMINE TIME NOT ELAPSE AFTER START OF OPERATION | PREDETERMINE TIME ELAPSES AFTER START OF OPERATION | |
| --- | --- | --- | --- |
|  |  | LOW OUTPUT | HIGH OUTPUT |
| ACCRACY OF DETERMINATION BASED ON Δ thw | HIGH | LOW | HIGH |
| ACCRACY OF DETERMINATION BASED ON Δ Tsens | LOW | HIGH | LOW |

[FIG. 11]
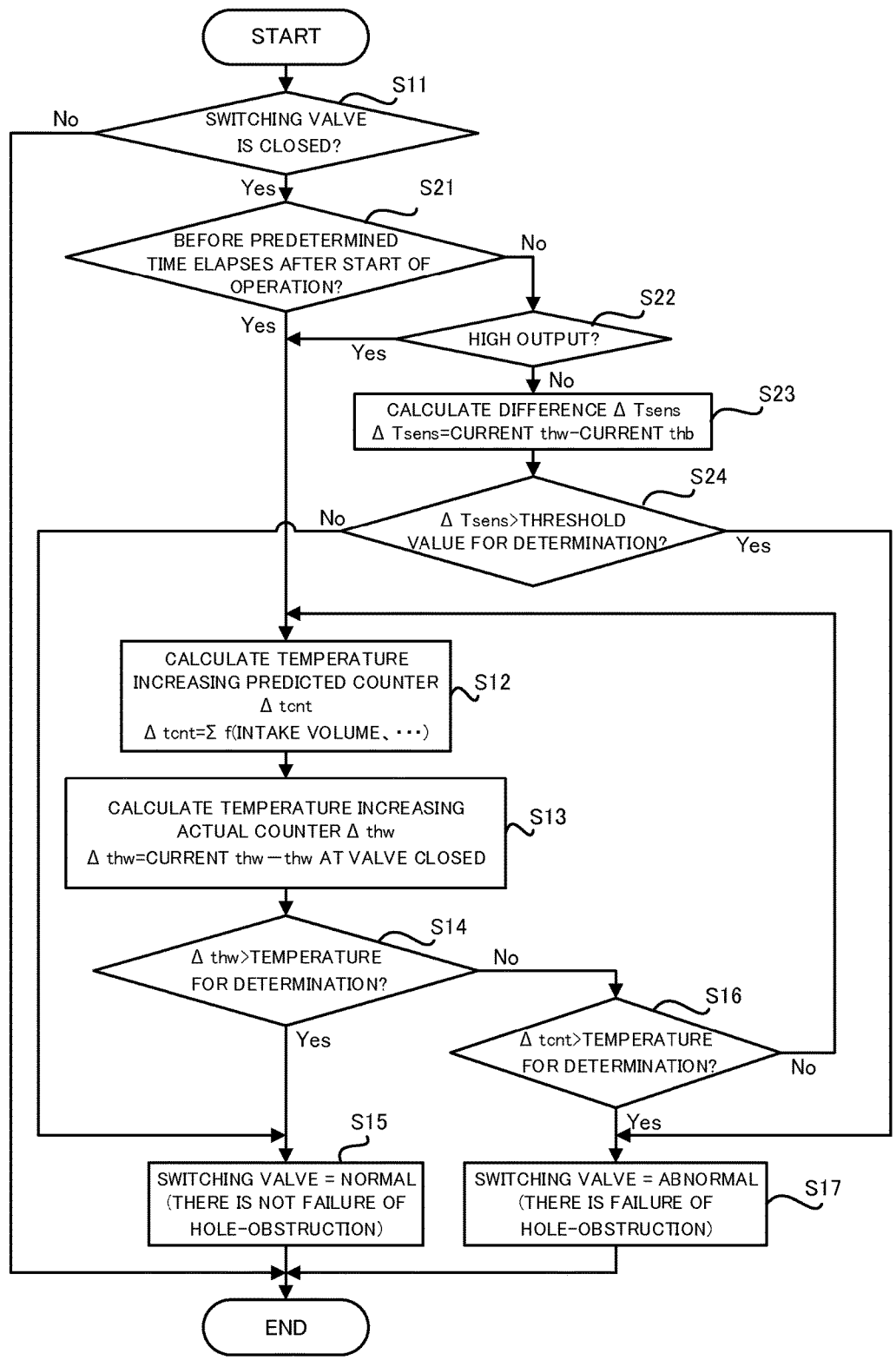

COOLING WATER CONTROL APPARATUS

CROSS-REFERENCE TO RELATED APPLICATION

This is a national phase application based on the PCT International Patent Application No. PCT/JP2013/062618 filed Apr. 30, 2013, the entire contents of which are incorporated herein by reference.

TECHNICAL FIELD

The present invention relates to a cooling water control apparatus for controlling a cooling apparatus which cools and/or warms an engine by circulating cooling water, for example.

BACKGROUND ART

A cooling apparatus for circulating a cooling water in order to cool and/or warm an engine is known heretofore. For example, a Patent Literature 1 discloses a cooling apparatus in which a first cooling water passage which circulates the cooling water and which passes through an inside of the engine and a second cooling water passage which circulates the cooling water and which does not pass through the inside of the engine are connected via a valve. According to the Patent Literature 1, the first cooling water passage is mainly used for cooling and/or warming the engine and second cooling water passage is mainly used for recovering exhaust heat from the engine.

Here, according to the Patent Literature 1, it is determined whether or not there is a closed failure of the valve, which connects the first and second cooling water passages, on the basis of a difference between temperature of the cooling water in the first cooling water passage and temperature of the cooling water in the second cooling water passage. This is because the temperature of the cooling water in the first cooling water passage which passes through the engine has relatively strong tendency to increase more rapidly than the temperature of the cooling water in the second cooling water passage which does not pass through the engine (namely, the difference between both temperatures has relatively strong tendency to increase), when the valve which should be opened is closed.

Incidentally, a Patent Literature 2 is listed as a background art which is related to the present invention.

CITATION LIST

Patent Literature

Patent Literature 1 Japanese Patent No. 4883225
Patent Literature 2 Japanese Patent Application Laid Open No. 2011-102545

SUMMARY OF INVENTION

Technical Problem

It is therefore an object of the present invention to provide, for example, a cooling water control apparatus which is capable of determining whether or not there is a failure of a valve in an aspect which is different from or better than the aspect of the technology disclosed in the Patent Literature 1, in a cooling apparatus in which a first pipe which circulates cooling water and which passes through an inside of an engine and a second pipe which circulates the cooling water and which does not pass through the inside of the engine are connected via the valve.

Solution to Problem

<1>

A disclosed cooling water control apparatus is a cooling water control apparatus for controlling a cooling apparatus, the cooling apparatus is provided with (i) a first pipe which circulates a cooling water and which passes through an inside of an engine; (ii) a second pipe which circulates the cooling water and which does not pass through the inside of the engine; and (iii) a switching valve which is disposed at a downstream side of the engine, a state of the switching valve is changed between an opened state and a closed state in accordance with a command, the opened state allows a first flow amount of cooling water to flow from the first pipe to the second pipe, the closed state allows a second flow amount of cooling water to flow from the first pipe to the second pipe, the second flow amount being less than the first flow amount, the cooling water control apparatus is provided with: a detecting device which detects a first temperature of the cooling water in a pipe portion of the first pipe, the pipe portion is located between the engine and the switching valve; and a determining device which determines that there is a failure of the switching valve whose state is the closed state, if a required period which is required from the output of the command for changing the state of the switching valve from the opened state to the closed state until the first temperature reaches a temperature for the determination which is higher than the first temperature is larger than a period for the determination.

The disclosed cooling water control apparatus is capable of controlling the cooling apparatus which cools the engine by circulating the cooling water.

The cooling apparatus is provided with: the first pipe, the second pipe and the switching valve.

The first pipe is a cooling water pipe for circulating the cooling water through the inside of the engine (for example, a water jacket of the engine). On the other hand, the second pipe is a cooling water pipe for circulating the cooling water not through the inside of the engine (in other words, while bypassing the engine).

The first and second pipes are connected (in other words, coupled) via the switching valve. Especially, the switching valve connects the first and second pipes at a position on the downstream side of the engine (namely, on more downstream side than the engine along a flowing direction of the cooling water). Incidentally, since the first pipe circulates the cooling water while passing through the inside of the engine and the second pipe circulates the cooling water while not passing through the inside of the engine, the switching valve may connect a pipe portion of the first pipe which is located at the downstream side of the engine and the second pipe.

The switching valve changes the state of the switching valve from the closed state to the opened state or from the opened state to the closed state in accordance with the command for changing the state of the switching valve. The switching valve whose state is the opened state allows the first flow amount of the cooling water to flow from the first pipe to the second pipe. On the other hand, the switching valve whose state is the closed state allows the second flow amount (the second flow amount is less than the first flow amount) of the cooling water to flow from the first pipe to the second pipe. In this case, it is preferable that the switching valve whose state is the closed state do not stop the flow of the cooling water from the first pipe to the second pipe. In other words, it is preferable that the switching valve whose state is the closed state do not set the flow amount of the cooling water which flows from the first pipe to the second pipe to zero.

The cooling water control apparatus determines whether or not there is the failure of the switching valve in the above described cooling apparatus. Especially, the cooling water control apparatus determines whether or not there is the failure of the switching valve whose state is the closed state. One example of the failure of the switching valve whose state is the closed state is a failure by which the flow amount of the cooling water which flows from the first pipe to the second pipe through the switching valve is fixed to zero undesirably. In other words, one example of the failure of the switching valve whose state is the closed state is a failure by which the state of the switching valve is fixed to a state in which it is difficult or impossible for the switching valve to allow the cooling water to flow from the first pipe to the second pipe.

In order to determine whether or not there is the failure of the switching valve whose state is the closed state, the cooling water control apparatus is provided with: the detecting device and the determining device.

The detecting device detects the first temperature of the cooling water in the first pipe. Especially, the detecting device detects the first temperature of the cooling water in the pipe portion of the first pipe which is located between the engine and the switching valve. In other words, the detecting device detects the first temperature of the cooling water in the pipe portion of the first pipe which is located at the downstream side of the engine and at an upstream side of the switching valve.

The determining device determines whether or not there is the failure of the switching valve whose state is the closed state on the basis of the first temperature which is detected by the detecting device. Especially, the determining device determines whether or not there is the failure of the switching valve whose state is the closed state on the basis of an increasing tendency (in other words, a variation tendency) of the first temperature after the state of the switching valve is changed from the opened state to the closed state.

Here, a difference between the increasing tendency of the first temperature in the case where there is the failure of the switching valve whose state is the closed state and the increasing tendency of the first temperature in the case where there is not the failure of the switching valve whose state is the closed state will be explained, before explaining the operation of determining whether or not there is the failure of the switching valve whose state is the closed state on the basis of the increasing tendency of the first temperature.

When there is not the failure of the switching valve whose state is the closed state, the second flow amount of the cooling water flows from the first pipe to the second pipe through the switching valve. Namely, the cooling water does not remain (in other words, circulates) in the first pipe. Therefore, the temperature of the cooling water in the engine is not likely to vary regardless of the position of the cooling water. Furthermore, the cooling water which circulates in the first pipe flows out from the engine as it is after being heated by the engine. Therefore, the cooling water which is heated by the engine circulates relatively smoothly and thus the first temperature has a tendency to increase easily or rapidly. Namely, the first temperature has a tendency to increase rapidly in accordance with the increasing aspect of the temperature of the cooling water in the engine. In other words, a delay between the increasing aspect of the first temperature and the increasing aspect of the temperature of the cooling water in the engine has a tendency to be relatively small.

On the other hand, when there is the failure of the switching valve whose state is the closed state, the cooling water does not flow from the first pipe to the second pipe through the switching valve. Thus, the cooling water remains (in other words, does not circulate) in the first pipe. Therefore, the temperature of the cooling water in the engine varies more easily depending on the position of the cooling water, compared to the case where there is not the failure of the switching valve whose state is the closed state. Furthermore, since the cooling water remains in the first pipe, the cooling water whose temperature is relatively high due to the heat of the engine never or does not easily flow out from the engine. Therefore, the first temperature increases due to a heat transfer through the cooling water from the cooling water which remains in the engine. Thus, the first temperature has a tendency not to increase easily or rapidly, because the heat transfer is inefficient. Namely, the first temperature has a tendency to increase behind the increasing aspect of the temperature of the cooling water in the engine. In other words, the delay of the increasing aspect of the first temperature has a tendency to be relatively large.

As described above, the increasing tendency of the first temperature in the case where there is the failure of the switching valve whose state is the closed state is different from the increasing tendency of the first temperature in the case where there is not the failure of the switching valve whose state is the closed state. Thus, the determining device is capable of determining whether or not there is the failure of the switching valve whose state is the closed state on the basis of the increasing tendency of the first temperature after the state of the switching valve is changed from the opened state to the closed state, by considering the difference of the increasing tendency of the first temperature.

Specifically, the determining device compares a magnitude relationship between the period for the determination and the required period which is required from the output of the command for changing the state of the switching valve from the opened state to the closed state until the first temperature reaches the temperature for the determination which is higher than the first temperature. Here, as described above, the required period which is required until the first temperature reaches the temperature for the determination in the case where there is the failure of the switching valve whose state is the closed state is longer than the required period which is required until the first temperature reaches the temperature for the determination in the case where there is not the failure of the switching valve whose state is the closed state. Therefore, the determining device is capable of determining that there is the failure of the switching valve whose state is the closed state, if the required period which is required until the first temperature reaches the temperature for the determination is larger than the period for the determination. Therefore, the determining device is capable of appropriately determining whether or not there is the failure of the switching valve whose state is the closed state.

Incidentally, the determining device may determine whether or not there is the failure of the switching valve whose state is the closed state by directly comparing the required period and the period for the determination. Alternatively, the determining device may determine whether or not there is the failure of the switching valve whose state is the closed state by virtually or indirectly comparing the required period and the period for the determination by using any parameter which indirectly represents the magnitude relationship between the required period and the period for the determination.

Moreover, the required period which is required until the first temperature reaches the temperature for the determination becomes longer as a difference between the temperature for the determination and the first temperature at the timing when the command for changing the state of the switching valve from the opened state to the closed state is outputted becomes larger, and thus the determining device needs more time to complete the determination. In other words, the required period which is required until the first temperature reaches the temperature for the determination becomes shorter as the difference between the temperature for the determination and the first temperature at the timing when the command for changing the state of the switching valve from the opened state to the closed state is outputted becomes smaller, and thus the determining device needs less time to complete the determination. On the other hand, the difference between the temperature for the determination and the first temperature at the timing when the command for changing the state of the switching valve from the opened state to the closed state is outputted may be set to large value from a viewpoint of appropriately distinguishing the difference of the increasing tendency of the first temperature (namely, improving an accuracy of the determination of the determining device). Therefore, the "temperature for the determination" may be set to an appropriate temperature on the basis of the first temperature at the timing when the command for changing the state of the switching valve from the opened state to the closed state and a trade-off between the time which is needed by the determining device to complete the determination and the accuracy of the determination of the determining device.

Moreover, the "period for the determination" may be set to an appropriate period which is capable of determining whether or not there is the failure of the switching valve whose state is the closed state, by an experiment, a simulation or the like based on a specification of the cooling apparatus and the like. Namely, the "period for the determination" may be set to an appropriate period which is capable of appropriately distinguishing the required period which is required when there is not the failure of the switching valve whose state is the closed state and the required period which is required when there is the failure of the switching valve whose state is the closed state on the basis of the difference between the increasing tendency of the first temperature in the case where there is the failure of the switching valve whose state is the closed state and the increasing tendency of the first temperature in the case where there is not the failure of the switching valve whose state is the closed state.

<2>

In another aspect of the disclosed cooling water control apparatus, the determining device determines whether or not there is the failure of the switching valve whose state is the closed state on the basis of whether or not the required time is larger than the period for the determination, when a predetermined time does not lapse after the engine starts to operate, the determining device determines whether or not there is the failure of the switching valve whose state is the closed state on the basis of a difference between the first temperature and a second temperature of the cooling water in the second pipe, when the predetermined time lapses after the engine starts to operate According to this aspect, the determining device is capable of determining whether or not there is the failure of the switching valve whose state is the closed state on the basis of the difference between the first temperature (namely, the temperature of the cooling water in the pipe portion of the first pipe which is located between the engine and the switching valve) and the second temperature (namely, the temperature of the cooling water in the second pipe).

Especially, the determining device is capable of selecting, as a parameter which is used to determine whether or not there is a failure of the switching valve whose state is the closed state, either one or both of the increasing tendency of the first temperature (namely, the magnitude relationship between the required period and the period for the determination) and the difference between the first and second temperatures on the basis of whether or not the predetermined time lapses after the engine starts to operate.

Specifically, when there is not the failure of the switching valve whose state is the closed state, the cooling water flows from the first pipe to the second pipe and thus the difference between the first and second temperatures becomes relatively small. On the other hand, when there is the failure of the switching valve whose state is the closed state, the cooling water remains in the first pipe and thus the first temperature increases more easily due to the heat of the engine than the second temperature. Therefore, when there is the failure of the switching valve whose state is the closed state, the difference between the first and second temperatures should become relatively large (for example, should be larger than a predetermined threshold value).

However, when the predetermined time does not lapse after the engine starts to operate, there is relatively low possibility that the engine is warmed up and thus the first temperature is likely to keep to be relatively low. As a result, although the difference between the first and second temperatures should become relatively large due to the failure of the switching valve whose state is the closed state, there is a possibility that the difference between the first and second temperatures does not become relatively large (for example, is not larger than the predetermined threshold value). Therefore, when the predetermined time does not lapse after the engine starts to operate, there is a possibility that the accuracy of the determination based on the difference between the first and second temperatures deteriorates. Thus, it is preferable that the determining device determine whether or not there is the failure of the switching valve whose state is the closed state on the basis of the increasing tendency of the first temperature (namely, the magnitude relationship between the required period and the period for the determination), when the predetermined time does not lapse after the engine starts to operate.

On the other hand, when the predetermined time lapses after the engine starts to operate, there is relatively high possibility that the engine is warmed up and thus it is predicted that the first temperature already increases to some extent. Thus, there is relatively small possibility that the situation which arises when the predetermined time does not lapse after the engine starts to operate does not arise. Namely, the difference between the first and second temperatures become relatively large if there is the failure of the switching valve whose state is the closed state, and the difference between the first and second temperatures become relatively small if there is not the failure of the switching valve whose state is the closed state. Thus, the determining device may determine whether or not there is the failure of the switching valve whose state is the closed state on the basis of the difference between the first and second temperatures, when the predetermined time lapses after the engine starts to operate.

<3>

In another aspect of the disclosed cooling water control apparatus which determines whether or not there is the failure of the switching valve whose state is the closed state on the basis of the difference between the first and second temperatures, the determining device determines that there is the failure of the switching valve whose state is the closed state, if the difference is larger than a predetermined threshold value.

According to this aspect, the determining device is capable of appropriately determining whether or not there is the failure of the switching valve whose state is the closed state on the basis of the difference between the first and second temperatures.

<4>

In another aspect of the disclosed cooling water control apparatus, the switching valve is provided with: (i) a valve portion which opens a passage between the first and second pipes such that the first flow amount of the cooling water flows from the first pipe to the second pipe when the state of the switching valve is the opened state and which closes the passage between the first and second pipes when the state of the switching valve is the closed state; and (ii) a micro flowing portion which allows the second flow amount of the cooling water to flow from the first pipe to the second pipe when the state of the switching valve is the closed state, the determining device determines that there is a failure of the micro flowing portion, if the required time is larger than the period for the determination.

According to this aspect, the switching valve is capable of allowing the second flow amount of the cooling water to flow from the first pipe to the second pipe even if the valve portion closes the passage between the first and second pipes, because the switching valve is provided with the micro flowing portion (for example, a micro flowing hole or a micro flowing pipe which is described later). The determining device is capable of appropriately determining whether or not there is a failure of the micro flowing portion in this switching valve.

The operation and other advantages of the present invention will become more apparent from embodiments explained below.

BRIEF DESCRIPTION OF DRAWINGS

FIG. 1 is a block diagram illustrating a structure of a vehicle of the present embodiment (especially, a structure relating to a cooling apparatus).

FIG. 3 is a block diagram illustrating the circulation aspect of the cooling water when the engine water temperature is within a first range.

FIG. 4 is a block diagram illustrating the circulation aspect of the cooling water when the engine water temperature is within a second range which is higher than the first range.

FIG. 5 is a block diagram illustrating the circulation aspect of the cooling water when the engine water temperature is within a third range which is higher than the second range.

FIG. 7 is a flowchart illustrating the flow of a first example of the operation of determining whether or not there is the failure of the switching valve which is closed.

FIG. 8 is a graph illustrating the relationship between the temperature increasing predicted counter/the temperature increasing actual counter and the existence/non-existence of the failure of the switching valve which is closed.

FIG. 9 is a graph illustrating the engine water temperature/bypass water temperature in the case where there is the failure of the switching valve which is closed and the engine water temperature/bypass water temperature in the case where there is not the failure of the switching valve which is closed.

FIG. 10 is a table illustrating an accuracy of the operation of determining whether or not there is the failure of the switching valve.

FIG. 11 is a flowchart illustrating the flow of a second example of the operation of determining whether or not there is the failure of the switching valve which is closed.

DESCRIPTION OF EMBODIMENTS

Figure 2A:
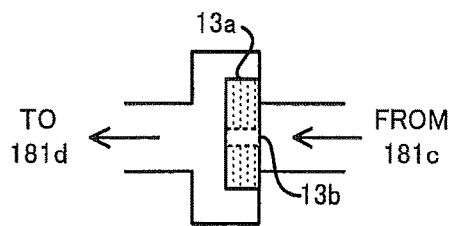
FIG. 2 are cross-sectional views illustrating a structure of a switching valve of the present embodiment.

Hereinafter, a vehicle 1 which is provided with a cooling apparatus 10 will be explained, as an embodiment of the present invention, with reference to the drawings.

(1) Structure of Vehicle

Firstly, with reference to FIG. 1, a structure of a vehicle 1 of the present embodiment (especially, a structure relating to a cooling apparatus 10) will be explained. FIG. 1 is a block diagram illustrating the structure of the vehicle 1 of the present embodiment (especially, the structure relating to the cooling apparatus 10).

As illustrated in FIG. 1, the vehicle 1 of the present embodiment is provided with: the cooling apparatus 10; an engine 20; and an ECU 30, The cooling apparatus 10 is provided with: a switching valve 13; an electrical WP (Water Pump) 16; a water temperature sensor 17b; and a water temperature sensor 17w. Furthermore, the cooling apparatus 10 may be provided with: an exhaust heat recovery equipment 11; a heater core 12; a radiator 14; and a thermostat 15. Moreover, the cooling apparatus 10 is provided with a cooling water pipe 18 which is constructed from a cooling water pipe 18a; a cooling water pipe 18b; a cooling water pipe 181a; a cooling water pipe 181b; a cooling water pipe 181c; a cooling water pipe 181d; a cooling water pipe 182a; a cooling water pipe 182b; a cooling water pipe 182c; a cooling water pipe 182d; a cooling water pipe 183a; and a cooling water pipe 183b.

The electrical WP 16 is a pump which ejects a desired flow amount of cooling water. The cooling water which is ejected from the electric WP 16 flows into the cooling water pipe 18a. The cooling water pipe 18a branches into the cooling water pipe 181a and the cooling water pipe 182a.

The cooling water pipe 181a is connected to the engine 20. The cooling water pipe 181b extends from the engine 20. The cooling water pipe 181b branches into the cooling water pipe 181c which is connected to the switching valve 13 and the cooling water pipe 183a which is connected to the radiator 14. The cooling water pipe 181d extends from the switching valve 13. The cooling water pipe 181d joins the cooling water pipe 182b which extends from the exhaust heat recovery equipment 11, and is connected to the cooling water pipe 182c which is connected to the heater core 12. The cooling water pipe 182d which is connected to the thermostat 15 extends from the heater core 12. The cooling water pipe 18b which is connected to the electrical WP 16 extends from the thermostat 15. Namely, the cooling water which is ejected from the electric WP 16 returns to the electric WP 16 by passing through the cooling water pipe 18a, the cooling water pipe 181a, the cooling water pipe 181b, the cooling water pipe 181c, the cooling water pipe 181d, the cooling water pipe 182c, the cooling water pipe 182d and the cooling water pipe 18b in this order. Namely, the cooling water pipe 18a, the cooling water pipe 181a, the cooling water pipe 181b, the cooling water pipe 181c, the cooling water pipe 181d, the cooling water pipe 182c, the cooling water pipe 182d and the cooling water pipe 18b form a main pipe which passes through the engine 20 (i.e. does not bypass the engine 20) and does not pass through the radiator 14 (i.e. bypasses the radiator 14). Incidentally, the main pipe is one example of the above described "first pipe".

On the other hand, the cooling water pipe 182a is connected to the exhaust heat recovery equipment 11. The cooling water pipe 182b extends from the exhaust heat recovery equipment 11. The cooling water pipe 182b joins the cooling water pipe 181d which extends from the switching valve 13, and is connected to the cooling water pipe 182c which is connected to the heater core 12. Namely, the cooling water which is ejected from the electric WP 16 returns to the electric WP 16 by passing through the cooling water pipe 18a, the cooling water pipe 182a, the cooling water pipe 182b, the cooling water pipe 182c, the cooling water pipe 182d and the cooling water pipe 18b in this order. Namely, the cooling water pipe 18a, the cooling water pipe 182a, the cooling water pipe 182b, the cooling water pipe 182c, the cooling water pipe 182d and the cooling water pipe 18b form a bypass pipe which does not pass through the engine 20 (i.e. bypasses the engine 20). Incidentally, the bypass pipe is one example of the above described "second pipe".

On the other hand, the cooling water pipe 183b, which is connected to the thermostat 15, extends from the radiator 14. Namely, the cooling water which is ejected from the electric WP 16 returns to the electric WP 16 by passing through the cooling water pipe 18a, the cooling water pipe 181a, the cooling water pipe 181b, the cooling water pipe 183a, the cooling water pipe 183b and the cooling water pipe 18b in this order. Namely, the cooling water pipe 18a, the cooling water pipe 181a, the cooling water pipe 181b, the cooling water pipe 183a, the cooling water pipe 183b and the cooling water pipe 18b form a sub pipe which passes through the engine 20 (i.e. does not bypass the engine 20) and passes through the radiator 14 (i.e. does not bypass the radiator 14).

The engine 20 is an apparatus which generates a driving power by burning a mixed gas of supplied fuel and air. For example, the engine 20 is a gasoline engine, a diesel engine or the like. Moreover, the engine 20 may be provided on a hybrid vehicle or the like. The cooling water flows into an engine block of the engine 20 from the cooling water pipe 181a. The cooling water which flows into the engine 20 passes through a water jacket of the engine 20. The cooling water which passes through the water jacket flows outwardly from an engine head of the engine 20 to the cooling water pipe 181b. The water jacket is located around a cylinder (not illustrated) in the engine 20. The cylinder exchanges heat with the cooling water which passes through the water jacket. As a result, the engine 20 is cooled.

The water temperature sensor 17w measures a temperature (hereinafter, it is referred to as an "engine water temperature") thw of the cooling water which passes through the engine 20. Especially, the water temperature sensor 17w is disposed at the cooling water pipe 181b which is located between the water jacket of the engine 20 and the switching valve 13. However, the water temperature sensor 17w may be disposed at the cooling water pipe 181c which is located between the water jacket of the engine 20 and the switching valve 13. Namely, in the present embodiment, a temperature of the cooling water which passes through the cooling water pipe 181b located between the water jacket of the engine 20 and the switching valve 13 is used as the engine water temperature thw. The engine water temperature thw which is measured by the water temperature sensor 17w is outputted to the ECU 30.

The exhausting heat recovery equipment 11 is located on an exhaust pipe (not illustrated) through which an exhaust gas ejected from the engine 20 passes. The cooling water passes through the exhausting heat recovery equipment 11. The exhausting heat recovery equipment 11 recovers an exhaust heat by exchanging a heat between the cooling water which pass through therein and the exhaust gas. Namely, the exhausting heat recovery equipment 11 is capable of heating up the cooling water by using the heat of the exhaust gas.

The heater core 12 recovers the heat of the cooling water by exchanging the heat between the air and the cooling water which pass through the heater core 12. The air heated by the heat which is recovered by the heater core 12 is blew into a vehicle cabin by a fan which is referred to as a heater blower (not illustrated) for the purpose of a heater, a defroster, a deice and the like.

The water temperature sensor 17b measures a temperature (hereinafter, it is referred to as a "bypass water temperature") thb of the cooling water which flows into the heater core 12. Especially, the water temperature sensor 17b is disposed at the cooling water pipe 182c which is located between the switching valve 13 and the heater core 12. However, the water temperature sensor 17b may be disposed at the cooling water pipe 181d which is located between the switching valve 13 and the heater core 12. Namely, in the present embodiment, a temperature of the cooling water which passes through the cooling water pipe 182c located between the switching valve 13 and the heater core 12 is used as the bypass water temperature thb. However, a temperature of the cooling water which passes through one portion of the bypass pipe (for example, the cooling water pipe 182a, the cooling water pipe 182b or the cooling water pipe 182d) may be used as the bypass water temperature thb. The bypass water temperature thb which is measured by the water temperature sensor 17b is outputted to the ECU 30.

The switching valve 13 is a valve (for example, a FCV (Flow Control Valve)) which is capable of changing an opened/closed state of a valve element 13a (see FIG. 2(a) to FIG. 2(d)), under the control of the ECU 30. For example, when the switching valve 13 is closed, the switching valve 13 prevents the cooling water from flowing from the cooling water pipe 181c to the cooling water pipe 181c1. In this case, the cooling water remains in the cooling water pipe 181a, the cooling water pipe 181b and the cooling water pipe 181c. On the other hand, when the switching valve 13 is opened, the switching valve 13 allows the cooling water to flow from the cooling water pipe 181c to the cooling water pipe 181d. In this case, the cooling water flowing outwardly from the engine 20 to the cooling water pipe 181b flows into the heater core 12 via the cooling water pipe 181c and the cooling water pipe 181d. In addition, the switching valve 13 is capable of adjusting open degree of the valve element 13a, under the control of the ECU 30. Namely, the switching valve 13 is capable of adjusting the flow amount of the cooling water which flows outwardly from the switching valve 13 to the cooling water pipe 181d (substantially, the flow amount of the cooling water in the main pipe) and the flow amount of the cooling water which flows outwardly from the switching valve 13 to the cooling water pipe 183a (substantially, the flow amount of the cooling water in the sub pipe).

Figure 2B:
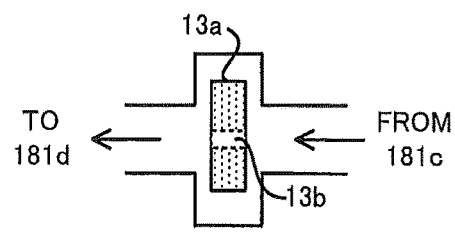
Figure 2C:
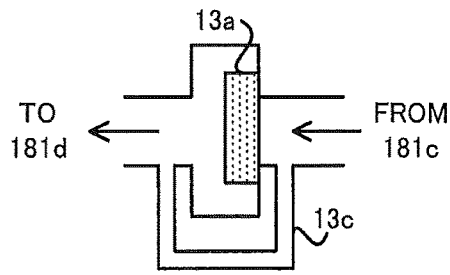
Figure 2D:
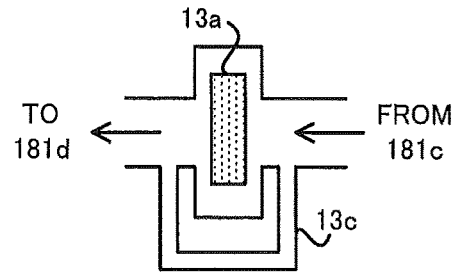
Figure 6A:
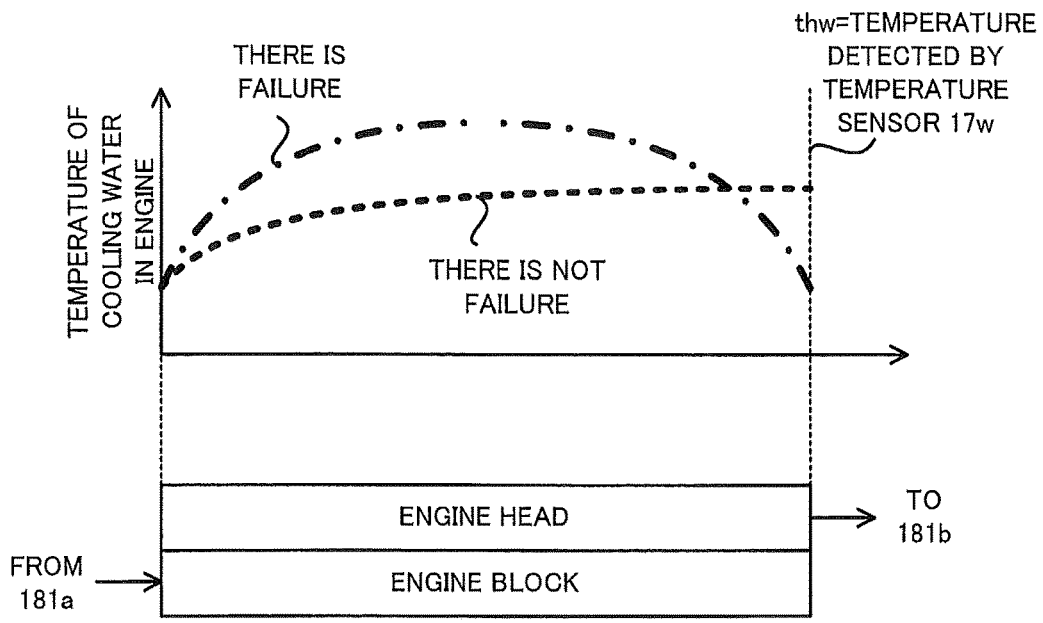
FIG. 6 are graph illustrating a distribution of the temperature of the cooling water in the engine and an increasing tendency of the engine water temperature thw in the case where there is the failure of the switching valve which is closed and a graph illustrating a distribution of the temperature of the cooling water in the engine and an increasing tendency of the engine water temperature thw in the case where there is not the failure of the switching valve which is closed.
Figure 6B:
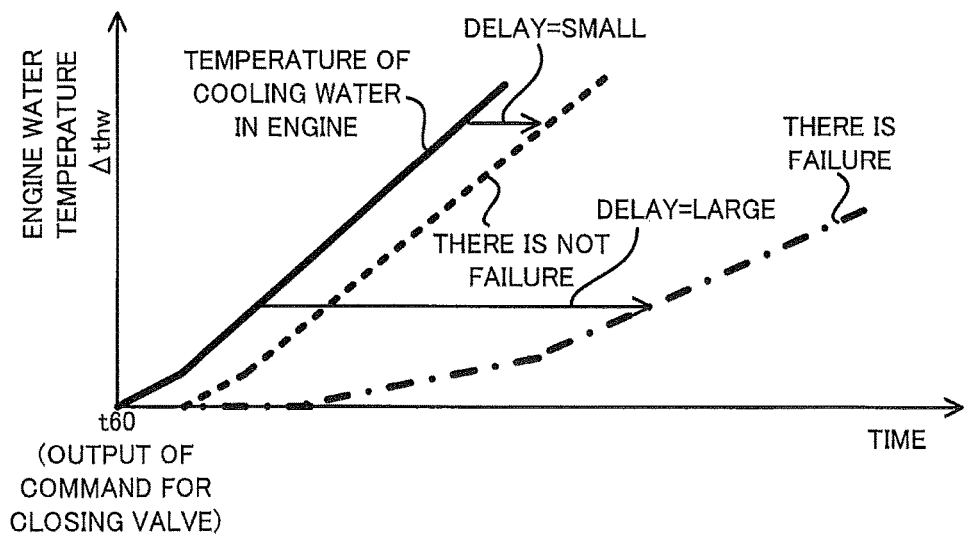

Here, with reference to FIG. 2(a) to FIG. 2(d), a structure of the switching valve 13 will be explained. FIG. 2(a) and FIG. 2(b) are cross-sectional views illustrating a first example of the structure of the switching valve 13. FIG. 2(c) and FIG. 2(d) are cross-sectional views illustrating a first example of the structure of the switching valve 13.

As illustrated in FIG. 2(a) and FIG. 2(b), the switching valve 13 may be provided with: the valve element 13a for physically closing (infilling, occluding) a space between the cooling water pipes 181c and 181d; and a micro flowing hole 13b which penetrates the valve element 13a in a direction along which the cooling water flows (namely, a direction from the cooling water pipe 181c to the cooling water pipe 181d).

In this case, when the switching valve 13 is closed, the valve element 13a physically closes the space between the cooling water pipes 181c and 181d. Therefore, the cooling water flows from the cooling water pipe 181c to the cooling water pipe 181d via the micro flowing hole 13b. On the other hand, when the switching valve 13 is opened, the valve element 13a moves such that the space (namely, the space which connects the cooling water pipes 181c and 181d) is formed between the cooling water pipes 181c and 181d. Therefore, the cooling water flows from the cooling water pipe 181c to the cooling water pipe 181d via the space around the valve element 13a in addition to or instead of the micro flowing hole 13b. Thus, the flow amount of the cooling water which flows from the cooling water pipe 181c to the cooling water pipe 181d when the switching valve 13 is opened is larger than the flow amount of the cooling water which flows from the cooling water pipe 181c to the cooling water pipe 181d when the switching valve 13 is closed.

Alternatively, as illustrated in FIG. 2(c) and FIG. 2(c), the switching valve 13 may be provided with: the valve element 13a for physically closing (infilling, occluding) the space between the cooling water pipes 181c and 181d; and a micro flowing pipe 13c which allows the cooling water to flow from the cooling water pipe 181c to the cooling water pipe 181d not through the valve element 13a.

In this case, when the switching valve 13 is closed, the valve element 13a physically closes the space between the cooling water pipes 181c and 181d. Therefore, the cooling water flows from the cooling water pipe 181c to the cooling water pipe 181d via the micro flowing pipe 13c. On the other hand, when the switching valve 13 is opened, the valve element 13a moves such that the space (namely, the space which connects the cooling water pipes 181c and 181d) is formed between the cooling water pipes 181c and 181d. Therefore, the cooling water flows from the cooling water pipe 181c to the cooling water pipe 181d via the space around the valve element 13a in addition to or instead of the micro flowing pipe 13c. Thus, the flow amount of the cooling water which flows from the cooling water pipe 181c to the cooling water pipe 181d when the switching valve 13 is opened is larger than the flow amount of the cooling water which flows from the cooling water pipe 181c to the cooling water pipe 181d when the switching valve 13 is closed.

Incidentally, the flow amount of the cooling water which flows from the cooling water pipe 181c to the cooling water pipe 181d may be appropriately adjusted in accordance with a moving distance of the valve element 13a.

Moreover, the switching valves 13 illustrated in FIG. 2(a) to FIG. 2(d) are examples, and the switching valve 13 whose structure is different from that of the switching valves 13 illustrated in FIG. 2(a) to FIG. 2(d) may be used. However, it is preferable that the switching valve 13 have a structure (for example, the above described micro flowing hole 13b, the above described micro flowing pipe 18c, or a structure which functions in a same manner as this hole or pipe) which is capable of allowing the cooling water to flow from the cooling water pipe 181c to the cooling water pipe 181d even when the switching valve 13 is closed.

Again in FIG. 1, in the radiator 14, the cooling water which passes through the radiator 14 is cooled by the air. In this case, the wind which is introduced by a rotation of the not-illustrated electrical fan facilitates the cooling of the cooling water in the radiator 14.

In addition, the thermostat 15 has a valve which is opened or closed depending on the temperature of the cooling water. Typically, the thermostat 15 opens its valve when the temperature of the cooling water is high (for example, is equal to or higher than a predetermined temperature). In this case, the cooling water pipe 183b is connected to the cooling water pipe 18b via the thermostat 15. As a result, the cooling water passes through the radiator 14. Thus, the cooling water is cooled and the excessive heating (overheat) of the engine 20 is prevented. On the other hand, the thermostat 15 closes its valve when the temperature of the cooling water is relatively low (for example, is not equal to or higher than the predetermined temperature). In this case, the cooling water does not pass through the radiator 14. Thus, the decrease of the temperature of the cooling water is prevented and the excessive cooling (overcool) of the engine 20 is prevented.

The electric WP 16 is configured to have an electric motor and circulates the cooling water in the cooling water pipe 18 by using the operation of the motor. Specifically, electric power is supplied to the electric WP 16 from a battery and a rotational number of the electric WP 16 and the like is controlled by a controlling signal supplied from the ECU 30. Incidentally, a mechanical water pump, which is capable of operating regardless of the operation of the engine 20 or in association with the operation of the engine 20 and being controlled by the ECU 30, may be used instead of the electric WP 16.

The ECU (Electronic Control Unit) 30 is provided with: a CPU (Central Processing Unit), a ROM (Read Only Memory), a RAM (Random Access Memory) and so on which are not illustrated. The ECU 30 is one example of the "cooling water control apparatus" and determines whether or not there is a failure of the switching valve 13 of the cooling apparatus 10.

(2) Specific Example of Circulation Aspect of Cooling Water in Cooling Apparatus Next, with reference to FIG. 3 to FIG. 5, a circulation aspect of the cooling water in the cooling apparatus 10 will be explained. FIG. 3 is a block diagram illustrating the circulation aspect of the cooling water when the engine water temperature thw is within a first range. FIG. 4 is a block diagram illustrating the circulation aspect of the cooling water when the engine water temperature thw is within a second range which is higher than the first range. FIG. 5 is a block diagram illustrating the circulation aspect of the cooling water when the engine water temperature thw is within a third range which is higher than the second range.

Firstly, when the engine water temperature thw is within the first range (for example, a temperature range which is less than T1 degree Celsius) in which the warm-up of the engine 20 is not completed, the ECU 30 outputs a command for closing the switching valve 13 into the switching valve 13. As a result, the switching valve 13 is closed. Furthermore, in this case, the thermostat 15 is closed. Therefore, as illustrated in FIG. 3, the flow of the cooling water from the cooling water pipe 181c to the cooling water pipe 181d and the flow of the cooling water from the cooling water pipe 183b to the cooling water pipe 18b are prevented. Thus, the cooling water remains in the cooling water pipe 181a, the cooling water pipe 181b, the cooling water pipe 181c and the cooling water pipe 181d which form the main pipe. Similarly, the cooling water remains in the cooling water pipe 183a and the cooling water pipe 183b which form the sub pipe. On the other hand, the cooling water circulates in the cooling water pipe 18a, the cooling water pipe 182a, the cooling water pipe 182b, the cooling water pipe 182c, the cooling water pipe 182d and the cooling water pipe 18b which form the bypass pipe. Incidentally, the arrows in FIG. 3 illustrate the flowing direction of the cooling water.

On the other hand, when the engine water temperature thw is within the second range (for example, a temperature range which is equal to or more than T1 degree Celsius and is less than T2 (T2 >T1) degree Celsius) in which the warm-up of the engine 20 is completed and the thermostat 15 is not opened, the ECU 30 outputs a command for opening the switching valve 13 into the switching valve 13. As a result, the switching valve 13 is opened. Furthermore, in this case, the thermostat 15 is closed. Therefore, as illustrated in FIG. 4, the flow of the cooling water from the cooling water pipe 181c to the cooling water pipe 181d is allowed. On the other hand, the flow of the cooling water from the cooling water pipe 183b to the cooling water pipe 18b is prevented. Thus, the cooling water circulates in the cooling water pipe 181a, the cooling water pipe 181b, the cooling water pipe 181c and the cooling water pipe 181d which form the main pipe. Similarly, the cooling water circulates in the cooling water pipe 18a, the cooling water pipe 182a, the cooling water pipe 182b, the cooling water pipe 182c, the cooling water pipe 182d and the cooling water pipe 18b which form the bypass pipe. On the other hand, the cooling water remains in the cooling water pipe 183a and the cooling water pipe 183b which form the sub pipe. Incidentally, the arrows in FIG. 4 illustrate the flowing direction of the cooling water.

On the other hand, when the engine water temperature thw is within the third range (for example, a temperature range which is equal to or more than T2 degree Celsius) in which the thermostat 15 is opened, the ECU 30 outputs the command for opening the switching valve 13 into the switching valve 13. As a result, the switching valve 13 is opened. Furthermore, in this case, the thermostat 15 is opened. Therefore, as illustrated in FIG. 5, the flow of the cooling water from the cooling water pipe 181c to the cooling water pipe 181d and the flow of the cooling water from the cooling water pipe 183b to the cooling water pipe 18b are allowed. Thus, the cooling water circulates in the cooling water pipe 181a, the cooling water pipe 181b, the cooling water pipe 181c and the cooling water pipe 181d which form the main pipe. Similarly, the cooling water circulates in the cooling water pipe 183a and the cooling water pipe 183b which form the sub pipe. Similarly, the cooling water circulates in the cooling water pipe 18a, the cooling water pipe 182a, the cooling water pipe 182b, the cooling water pipe 182c, the cooling water pipe 182d and the cooling water pipe 18b which form the bypass pipe. Incidentally, the arrows in FIG. 5 illustrate the flowing direction of the cooling water.

(3) Flow of Operation of Determining Whether or not there is a Failure of Switching Valve Next, with reference to FIG. 6 to FIG. 11, a flow of the operation of determining whether or not there is the failure of the switching valve 13. Especially, in the following, a flow of the operation of determining whether or not there is the failure of the switching valve 13 which is closed will be explained Incidentally, in the present embodiment, the failure of the switching valve 13 which is closed is regarded as a failure by which the cooling water is not capable of passing through the switching valve 13 which is closed (namely, the cooling water is not capable of flowing from the cooling water pipe 181c to the cooling water pipe 181d through the switching valve 13 which is closed). This failure could be caused by an obstruction of the above described micro flowing hole 13b or an obstruction of the above described micro flowing pipe 13c, for example.

(3-1) First Operation of Determining Whether or not there is a Failure of Switching Valve Firstly, with reference to FIG. 6, a first example of the operation (hereinafter, it is referred to as a "first determining operation") of determining whether or not there is the failure of the switching valve 13 will be explained. FIG. 6 are graphs illustrating a distribution of the temperature of the cooling water in the engine 20 and an increasing tendency of the engine water temperature thw in the case where there is the failure of the switching valve 13 which is closed and illustrating a distribution of the temperature of the cooling water in the engine 20 and an increasing tendency of the engine water temperature thw in the case where there is not the failure of the switching valve 13 which is closed.

In the first determining operation, the ECU 30 determines whether or not there is the failure of the switching valve 13 which is closed on the basis of the increasing tendency of the engine water temperature thw. This is because the increasing tendency of the engine water temperature thw in the case where there is the failure of the switching valve 13 which is closed is different from the increasing tendency of the engine water temperature thw in the case where there is not the failure of the switching valve 13 which is closed. In the following, the difference between the increasing tendency of the engine water temperature thw in the case where there is the failure of the switching valve 13 which is closed and the increasing tendency of the engine water temperature thw in the case where there is not the failure of the switching valve 13 which is closed will be explained.

When there is not the failure of the switching valve 13 which is closed, the cooling water flows from the cooling water pipe 181c to the cooling water pipe 181d through the micro flowing hole 13b (alternatively, the micro flowing pipe 13c) of the switching valve 13. Namely, the cooling water does not remain (in other words, circulates) in the main pipe. Therefore, as illustrated by a dashed line in FIG. 6(a), the variation (namely, the variation depending on the position of the cooling water) of the temperature of the cooling water in the engine 20 (namely, the cooling water which exists in the engine block and the engine head) is relatively small. However, even in this case, typically, the temperature of the cooling water in the engine 20 is the lowest at a vicinity of a flow-in terminal of the engine 20 for the cooling water. Moreover, typically, the temperature of the cooling water in the engine 20 increases as the cooling water passes through the engine 20.

Furthermore, since the cooling water does not remain in the main pipe, the cooling water which circulates in the main pipe flows out from the engine 20 as it is after being heated by the engine 20. Therefore, as illustrated by a dashed line in FIG. 6(b), the engine water temperature thw corresponding to the temperature of the cooling water which flows out from the engine 20 has a tendency to increase easily or rapidly, because the cooling water which is heated by the engine 20 smoothly flows out from the engine 20. Namely, the engine water temperature thw has a tendency to increase rapidly in accordance with the increasing aspect of the temperature of the cooling water in the engine 20. In other words, a delay of the increasing aspect of the engine water temperature thw with respect to the increasing aspect of the temperature of the cooling water in the engine 20 has a tendency to be relatively small.

On the other hand, when there is the failure of the switching valve 13 which is closed, the cooling water does not flow from the cooling water pipe 181c to the cooling water pipe 181d through the micro flowing hole 13b (alternatively, the micro flowing pipe 13c) of the switching valve 13. Thus, the cooling water remains (in other words, does not circulate) in the main pipe. Therefore, as illustrated by a dashed-dotted line in FIG. 6(a). the variation of the temperature of the cooling water in the engine 20 is relatively large. Typically, the temperature of the cooling water in the engine 20 is the highest at a vicinity of a center of the engine 20 where there is the cylinder. In other words, the temperature of the cooling water in the engine 20 decreases as the cooling water is away from the center of the engine 20 more. Namely, although the temperature of the cooling water in the engine 20 increases, the engine water temperature 20 does not increase easily.

Furthermore, since the cooling water remains in the main pipe, the cooling water whose temperature is relatively high due to the heat of the engine 20 never or does not easily flow out from the engine 20. Therefore, the engine water temperature thw corresponding to the temperature of the cooling water which flows out from the engine 20 increases due to a heat transfer through the cooling water from the cooling water which remains in the engine 20. Thus, as illustrated by a dashed-dotted line in FIG. 6(b), the engine water temperature thw has a tendency not to increase easily or rapidly, because the heat transfer from the cooling water is inefficient. Namely, the engine water temperature thw has a tendency to increase behind the increasing aspect of the temperature of the cooling water in the engine 20. In other words, the delay of the increasing aspect of the engine water temperature thw with respect to the increasing aspect of the temperature of the cooling water in the engine 20 has a tendency to be relatively large.

As described above, the increasing tendency of the engine water temperature thw in the case where there is the failure of the switching valve 13 which is closed is different from the increasing tendency of the engine water temperature thw in the case where there is not the failure of the switching valve 13 which is closed. Thus, the ECU 30 is capable of determining whether or not there is the failure of the switching valve 13 which is closed on the basis of the above described difference of the increasing tendency of the engine water temperature thw.

In the following, with reference to FIG. 7, one example of a flow of the first example of the operation of determining whether or not there is the failure of the switching valve 13 which is closed on the basis of the increasing aspect of the engine water temperature thw. FIG. 7 is a flowchart illustrating the flow of the first example of the operation of determining whether or not there is the failure of the switching valve 13 which is closed.

As illustrated in FIG. 7, the ECU 30 determines whether or not the command for closing the switching valve 13 is outputted (step S11). In other words, the ECU 30 determines whether or not the switching valve 13 which is opened is newly closed.

As a result of the determination at the step S11, if it is determined that the command for closing the switching valve 13 is not outputted (step S11: No), the ECU 30 ends the operation. In this case, the ECU 30 may repeat the first determining operation illustrated in FIG. 7 regularly or randomly.

On the other hand, as a result of the determination at the step S11, if it is determined that the command for closing the switching valve 13 is outputted (step S11: Yes), the ECU 30 calculates a temperature increasing predicted counter Δtcnt which corresponds to a predicted value of an increasing amount of the engine water temperature thw after command for closing the switching valve 13 is outputted (step S12). In addition, the ECU 30 calculates a temperature increasing actual counter Δthw (=current engine water temperature thw−the engine water temperature thw at a timing when the command for closing the switching valve 13 is outputted) which corresponds to an actually measured value of the increasing amount of the engine water temperature thw after command for closing the switching valve 13 is outputted (step S13).

The ECU 30 uses the temperature increasing predicted counter Δtcnt as an index value for appropriately distinguishing the increasing amount of the engine water temperature thw in the case where there is not the failure of the switching valve 13 which is closed and the increasing amount of the engine water temperature thw in the case where there is the failure of the switching valve 13 which is closed. Thus, the temperature increasing predicted counter Δtcnt may be an average value (alternatively, a weighted average value) of the predicted value of the increasing amount of the engine water temperature thw in the case where there is the failure of the switching valve 13 which is closed and the predicted value of the increasing amount of the engine water temperature thw in the case where there is not the failure of the switching valve 13 which is closed.

The ECU 30 may calculate the above described temperature increasing predicted counter Δtcnt on the basis of a desired function (alternatively, a desired table, map, or any information which represents any correlation) having, as an argument, any parameter which could affect the increasing tendency of the engine water temperature thw. An intake volume (intake air amount) of the engine 20 is one example of the parameter which could affect the increasing tendency of the engine water temperature thw, for example.

Then, the ECU 30 determines which one of the temperature increasing predicted counter Δtcnt and the temperature increasing actual counter Δthw becomes larger than a temperature for the determination in first (step S14 and step S16). Incidentally, the temperature of the determination may be any temperature which is higher than the engine water temperature thw at the timing when the command for closing the switching valve 13 is outputted.

As a result of the determination at the step S14 and the step S16, if it is determined that the temperature increasing actual counter Δthw becomes larger than the temperature for the determination in first (step S14: Yes), the ECU 30 determines that there is not the failure of the switching valve 13 which is closed (step S15).

On the other hand, as a result of the determination at the step S14 and the step S16, if it is determined that the temperature increasing predicted counter Δtcnt becomes larger than the temperature for the determination in first (step S14: No and step S16: Yes), the ECU 30 determines that there is the failure of the switching valve 13 which is closed (step S17).

The ECU 30 repeats the above described operation from the step S12 to the step S16 until it is determined either one of the temperature increasing predicted counter Δtcnt and the temperature increasing actual counter Δthw becomes larger than the temperature for the determination.

Here, with reference to FIG. 8, a relationship between the temperature increasing predicted counter Δtcnt/the temperature increasing actual counter Δthw and the existence/non-existence of the failure of the switching valve 13 which is closed will be explained. FIG. 8 is a graph illustrating the relationship between the temperature increasing predicted counter Δtcnt/the temperature increasing actual counter Δthw and the existence/non-existence of the failure of the switching valve 13 which is closed.

As illustrated in FIG. 8, the temperature increasing actual counter Δthw in the case where there is the failure of the switching valve 13 which is closed has a tendency not to increase easily, compared to the temperature increasing actual counter Δthw in the case where there is not the failure of the switching valve 13 which is closed. The reason is already described in the above explanation. Therefore, if the temperature increasing actual counter Δthw becomes larger than the temperature for the determination sooner than the temperature increasing predicted counter Δtcnt (see a white circle at a time t81 in FIG. 8), it is predicted that there is a high possibility that there is not the failure of the switching valve 13 which is closed. On the other hand, if the temperature increasing predicted counter Δtcnt becomes larger than the temperature for the determination sooner than the temperature increasing actual counter Δthw (see a black circle at a time t82 in FIG. 8), it is predicted that there is a high possibility that there is the failure of the switching valve 13 which is closed.

Incidentally, as illustrated in FIG. 8, if the temperature for the determination is excessively small (for example, a difference between the temperature of the determination and the engine water temperature thw at the timing when the command for closing the switching valve 13 is outputted is excessively small), there is a possibility that it is difficult to determine whether or not there is the failure of the switching valve 13 which is closed. This is because there is the delay of the increasing aspect of the engine water temperature thw with respect to the increasing aspect of the temperature of the cooling water in the engine 20, as described above. Therefore, it is preferable that the temperature for the determination be set to a temperature which is capable of determining whether or not there is the failure of the switching valve 13 which is closed.

Moreover, as illustrated in FIG. 8, it can be said that the operation of determining which one of the temperature increasing predicted counter Δtcnt and the temperature increasing actual counter Δthw becomes larger than the temperature for the determination in first substantially corresponds to an operation of determining whether or not a period which is required for the temperature increasing actual counter Δthw to be larger than the temperature for the determination is larger than a predetermined value (for example, a period which is required for the temperature increasing predicted counter Δtcnt to be larger than the temperature for the determination). In this case, if the period (for example, t81-t80 in FIG. 8) which is required for the temperature increasing actual counter Δthw to be larger than the temperature for the determination is smaller than the period (for example, t82-t80 in FIG. 8) which is required for the temperature increasing predicted counter Δtcnt to be larger than the temperature for the determination, it is predicted that there is high possibility that there is not the failure of the switching valve 13 which is closed. If the period (for example, t83-t80 in FIG. 8) which is required for the temperature increasing actual counter Δthw to be larger than the temperature for the determination is not smaller than the period (for example, t82-t80 in FIG. 8) which is required for the temperature increasing predicted counter Δtcnt to be larger than the temperature for the determination, it is predicted that there is high possibility that there is the failure of the switching valve 13 which is closed. Therefore, the ECU 30 may determine whether or not there is the failure of the switching valve 13 which is closed by measuring or predicting the period which is required for the temperature increasing predicted counter Δtcnt to be larger than the temperature for the determination and the period which is required for the temperature increasing actual counter Δthw to be larger than the temperature for the determination and by determining the magnitude relationship between these two times. Incidentally, the period which is required for the temperature increasing predicted counter Δtcnt to be larger than the temperature for the determination is one example of the above described "period for the determination". Moreover, the period which is required for the temperature increasing actual counter Δthw to be larger than the temperature for the determination is one example of the above described "required period".

Moreover, the ECU 30 may indirectly determine which one of the temperature increasing predicted counter Δtcnt and the temperature increasing actual counter Δthw becomes larger than the temperature for the determination in first by performing a determining operation whose aspect is different from the above described aspect. In other words, the ECU 30 may determine the magnitude relationship between the period which is required for the temperature increasing predicted counter Δtcnt to be larger than the temperature for the determination and the period which is required for the temperature increasing actual counter Δthw to be larger than the temperature for the determination by performing the determining operation whose aspect is different from the above described aspect. The ECU 30 may perform any determining operation which is capable of directly or indirectly determining the above described difference between the increasing tendency of the engine water temperature thw in the case where there is the failure of the switching valve 13 which is closed and the increasing tendency of the engine water temperature thw in the case where there is not the failure of the switching valve 13 which is closed For example, the ECU 30 may determine whether or not there is the failure of the switching valve 13 which is closed, by determining whether or not the temperature increasing actual counter Δthw at a timing when a predetermined time lapses after the command for closing the switching valve 13 is outputted is larger than a predetermined value (for example, the temperature increasing predicted counter Δtcnt at the timing when the predetermined time lapses after the command for closing the switching valve 13 is outputted). In this case, if the temperature increasing actual counter Δthw at the timing when the predetermined time lapses after the command for closing the switching valve 13 is outputted is larger than the predetermined value (see the white circle at the time t81 in FIG. 8), the ECU 30 may determine that there is not the failure of the switching valve 13 which is closed. On the other hand, if the temperature increasing actual counter Δthw at the timing when the predetermined time lapses after the command for closing the switching valve 13 is outputted is not larger than the predetermined value (see the black circle at the time t82 in FIG. 8), the ECU 30 may determine that there is the failure of the switching valve 13 which is closed.

As described above, according to the first determining operation, the ECU 30 is capable of determining whether or not there is the failure of the switching valve 13 which is closed on the basis of the increasing tendency of the engine water temperature thw. Especially, the ECU 30 is capable of determining whether or not there is the failure of the switching valve 13 which is closed on the basis of such a characteristic that "the increasing tendency of the engine water temperature thw, which has the delay with respect to (namely, increases behind) the increasing tendency of the temperature of the cooling water in the engine 20, varies depending on the existence/non-existence of the failure of the switching valve 13 which is closed". Therefore, the ECU 30 is capable of appropriately determining whether or not there is the failure of the switching valve 13 which is closed.

(3-2) Second Operation of Determining Whether or not there is a Failure of Switching Valve Next, with reference to FIG. 9 and FIG. 10, a second example of the operation (hereinafter, it is referred to as a "second determining operation") of determining whether or not there is the failure of the switching valve 13 will be explained. FIG. 9 is a graph illustrating the engine water temperature thw/bypass water temperature thb in the case where there is the failure of the switching valve 13 which is closed and the engine water temperature thw/bypass water temperature thb in the case where there is not the failure of the switching valve 13 which is closed. FIG. 10 is a table illustrating an accuracy of the operation of determining whether or not there is the failure of the switching valve 13.

In the second determining operation, the ECU 30 determines whether or not there is the failure of the switching valve 13 which is closed on the basis of a difference ΔTsens (=the engine water temperature thw–the bypass water temperature thb) between the engine water temperature thw and the bypass water temperature thb, in addition to or instead of the increasing tendency of the engine water temperature thw (namely, the above described temperature increasing actual counter Δthw).

Here, the operation of determining whether or not there is the failure of the switching valve 13 which is closed on the basis of the difference ΔTsens between the engine water temperature thw and the bypass water temperature thb will be explained.

When there is not the failure of the switching valve 13 which is closed, the cooling water flows from the cooling water pipe 181*c* to the cooling water pipe 181*d* through the switching valve 13. Thus, as illustrated by a dashed line in FIG. 9, the difference ΔTsens between the engine water temperature thw (namely, the temperature of the cooling water at the upstream side of the switching valve 13) and the bypass water temperature thb (namely, the temperature of the cooling water at the downstream side of the switching valve 13) is relatively small.

On the other hand, when there is the failure of the switching valve 13 which is closed, the cooling water remains in the main pipe. Thus, the engine water temperature thw increases due to the heat of the engine 20 more easily than the bypass water temperature thb. Therefore, as illustrated by a dashed-dotted line in FIG. 9, the difference ΔTsens between the engine water temperature thw (namely, the temperature of the cooling water at the upstream side of the switching valve 13) and the bypass water temperature thb (namely, the temperature of the cooling water at the downstream side of the switching valve 13) is relatively large, when there is the failure of the switching valve 13 which is closed.

Thus, the ECU 30 determines whether or not there is the failure of the switching valve 13 which is closed by determining whether or not the difference ΔTsens is larger than a predetermine threshold value for the determination. Specifically, the ECU 30 determines that there is the failure of the switching valve 13 which is closed, if the difference ΔTsens is larger than the predetermine threshold value for the determination. On the other hand, the ECU 30 determines that there is not the failure of the switching valve 13 which is closed, if the difference ΔTsens is not larger than the predetermine threshold value for the determination.

Especially in the second determining operation, the ECU 30 selects, as a specific method of determining whether or not there is the failure of the switching valve 13 which is closed, either one of the "determining operation based on the increasing tendency of the engine water temperature thw" and the "determining operation based on the difference ΔTsens" on the basis of an elapsed time after the engine 20 starts to operate.

Specifically, when there is the failure of the switching valve 13 which is closed, the difference ΔTsens between the engine water temperature thw and the bypass water temperature thb should be relatively large (for example, larger than the predetermined threshold value), as described above. However, when the elapsed time after the engine 20 starts to operate is relatively short (for example, shorter than a predetermine time), there is relatively low possibility that the engine 20 is warmed up and thus the engine water temperature thw does not increase relatively easily or increase relatively slowly. In other words, when the elapsed time after the engine 20 starts to operate is relatively short, the engine water temperature thw is likely to keep to be relatively low. As a result, as illustrated in a left-side time region (especially, a time region which is surrounded by a thin dashed line) in the graph of FIG. 9, although the difference ΔTsens should be relatively large because there is the failure of the switching valve 13 which is closed, there is a possibility that the difference ΔTsens is not relatively large (for example, is not larger than the predetermined threshold value). Namely, when the elapsed time after the engine 20 starts to operate is relatively short, there is a possibility that the difference ΔTsens is not larger than the threshold value for the determination even when there is the failure of the switching valve 13 which is closed. Therefore, when the elapsed time after the engine 20 starts to operate is relatively short, there is a possibility that the accuracy of the determination based on the difference ΔTsens deteriorates. Thus, when the elapsed time after the engine 20 starts to operate is relatively short, it is preferably that the ECU 30 determine whether or not there is the failure of the switching valve 13 which is closed on the basis of the increasing tendency of the engine water temperature thw.

On the other hand, when the elapsed time after the engine 20 starts to operate is relatively long (for example, longer than the predetermine time), there is relatively high possibility that the engine 20 is warmed up and thus it is predicted that the engine water temperature thw already increases to some extent. Thus, as illustrated in a right-side time region (especially, a time region which is surrounded by a thin dashed line) in the graph of FIG. 9, the difference ΔTsens is relatively large (for example, larger than the threshold value for the determination) when there is the failure of the switching valve 13 which is closed and the difference ΔTsens is relatively small (for example, not larger than the threshold value for the determination) when there is not the failure of the switching valve 13 which is closed. Therefore, when the elapsed time after the engine 20 starts to operate is relatively long, the accuracy of the determination based on the difference ΔTsens rarely or never deteriorate to cause an incorrect determination. Thus, when the elapsed time after the engine 20 starts to operate is relatively long, the ECU 30 may determine whether or not there is the failure of the switching valve 13 which is closed on the basis of the difference ΔTsens between the engine water temperature thw and the bypass water temperature thb.

Moreover, when the elapsed time after the engine 20 starts to operate is relatively long, there is a possibility that the engine water temperature thw does not increase easily not only when there is the failure of the switching valve 13 which is closed but also when there is not the failure of the switching valve 13 which is closed, depending on the operational condition of the engine 20. In other words, when the elapsed time after the engine 20 starts to operate is relatively long, there is a possibility that the increasing tendency of the engine water temperature thw in the case where there is the failure of the switching valve 13 which is closed is not clearly different from the increasing tendency of the engine water temperature thw in the case where there is not the failure of the switching valve 13 which is closed, depending on the operational condition of the engine 20. Namely, there is a possibility that the ECU 30 is not capable of appropriately determining that the increasing tendency of the engine water temperature thw (for example, such a tendency that the engine water temperature thw does not increase easily) is caused by the failure of the switching valve 13 which is closed or by the increase of the engine water temperature thw to some extent. Therefore, when the elapsed time after the engine 20 starts to operate is relatively long, there is a possibility that the accuracy of the determination based on the increasing tendency of the engine water temperature thw deteriorates, depending on the operational condition of the engine 20.

Such a situation that it is difficult to appropriately determine the cause of the increasing tendency of the engine water temperature thw arises more often when an output of the engine 20 is relatively low (alternatively, lower than a predetermined output). This is because the heat of the engine 20 is relatively large when the output of the engine is relatively high (alternatively, higher than the predetermined output) and thus such a situation that the engine water temperature thw does not increase easily does not arise so often.

Therefore, the ECU 30 may determine whether or not there is the failure of the switching valve 13 which is closed on the basis of the difference ΔTsens between the engine water temperature thw and the bypass water temperature thb, when the elapsed time after the engine 20 starts to operate is relatively long and the output of the engine 20 is relatively low. On the other hand, the ECU 30 may determine whether or not there is the failure of the switching valve 13 which is closed on the basis of at least one of the increasing tendency of the engine water temperature thw and the difference ΔTsens between the engine water temperature thw and the bypass water temperature thb, when the elapsed time after the engine 20 starts to operate is relatively long and the output of the engine 20 is relatively high.

FIG. 10 illustrates the relationship between the "accuracy of the operation of determining whether or not there is the failure of the switching valve 13 which is closed" and the "elapsed time after the engine 20 starts to operate"/the "output of the engine 20".

As illustrated in FIG. 10, when the elapsed time after the engine 20 starts to operate is relatively short (for example, shorter than the predetermine time), the accuracy of the determination based on the increasing tendency of the engine water temperature thw is high and never or rarely causes the incorrect determination. On the other hand, the accuracy of the determination based on the difference ΔTsens between the engine water temperature thw and the bypass water temperature thb could be low and may cause the incorrect determination.

Moreover, when the elapsed time after the engine 20 starts to operate is relatively long (for example, longer than the predetermine time) and the output of the engine 20 is relatively low (for example, lower than the predetermined output), the accuracy of the determination based on the difference ΔTsens between the engine water temperature thw and the bypass water temperature thb is high and never or rarely causes the incorrect determination. On the other hand, the accuracy of the determination based on the increasing tendency of the engine water temperature thw could be low and may cause the incorrect determination.

Moreover, when the elapsed time after the engine 20 starts to operate is relatively long (for example, longer than the predetermine time) and the output of the engine 20 is relatively high (for example, higher than the predetermined output), the accuracy of the determination based on the increasing tendency of the engine water temperature thw is high and never or rarely causes the incorrect determination. On the other hand, the accuracy of the determination based on the difference ΔTsens between the engine water temperature thw and the bypass water temperature thb could not be low and may not cause the incorrect determination, but is lower than the accuracy of the determination based on the increasing tendency of the engine water temperature thw.

Therefore, it is preferable that the ECU 30 determine in an appropriate manner whether or not there is the failure of the switching valve 13 which is closed by considering the relationship between the "accuracy of the operation of determining whether or not there is the failure of the switching valve 13 which is closed" and the "elapsed time after the engine 20 starts to operate"/the "output of the engine 20" which is illustrated in FIG. 10. In the following, with reference to FIG. 11, one example of a flow of the second example of the operation of determining whether or not there is the failure of the switching valve 13 which is closed on the basis of the increasing aspect of the engine water temperature thw and the difference ΔTsens between the engine water temperature thw and the bypass water temperature thb. FIG. 11 is a flowchart illustrating the flow of the second example of the operation of determining whether or not there is the failure of the switching valve 13 which is closed. Incidentally, a detailed explanation of the operation which is same as the operation of the above described first determining operation will be omitted by adding same step number.

As illustrated in FIG. 11, even in the second determining operation, the ECU 30 determines whether or not the command for closing the switching valve 13 is outputted (step S11).

As a result of the determination at the step S11, if it is determined that the command for closing the switching valve 13 is outputted (step S11: Yes), the ECU 30 determines whether or not the elapsed time after the engine 20 starts to operate is relatively short (for example, shorter than the predetermine time) (step S21).

Incidentally, a value which is capable of appropriately distinguishing a case where the accuracy of the determination based on the difference ΔTsens between the engine water temperature thw and the bypass water temperature thb is relatively low and a case where this accuracy is relatively high is preferably used as the predetermine time. This predetermine time may be set in advance by an experiment, a simulation or the like based on the relationship between the "accuracy of the determination based on the difference ΔTsens between the engine water temperature thw and the bypass water temperature thb" and the "elapsed time after the engine 20 starts to operate" which is illustrated in FIG. 9 and FIG. 10.

As a result of the determination at the step S21, if it is determined that the elapsed time after the engine 20 starts to operate is relatively short (for example, shorter than the predetermine time) (step S21: Yes), the ECU 30 determines whether or not there is the failure of the switching valve 13 which is closed on the basis of the increasing tendency of the engine water temperature thw. In other words, the ECU 30 determines whether or not there is the failure of the switching valve 13 which is closed by performing the above described first determining operation (step S12 to step S17).

On the other hand, as a result of the determination at the step S21, if it is determined that the elapsed time after the engine 20 starts to operate is not relatively short (for example, not shorter than the predetermine time) (step S21: No), then the ECU 30 determines whether or not the output of the engine 20 is relatively high (alternatively, higher than the predetermined output) (step S22).

Incidentally, a value which is capable of appropriately distinguishing a case where the accuracy of the determination based on the increasing tendency of the engine water temperature thw is relatively low and a case where this accuracy is relatively high is preferably used as the predetermine output. This predetermine time may be set in advance by an experiment, a simulation or the like based on the relationship between the "accuracy of the determination based on the increasing tendency of the engine water temperature thw" and the "output of the engine 20" which is illustrated in FIG. 9 and FIG. 10.

As a result of the determination at the step S22, if it is determined that the output of the engine 20 is relatively high (alternatively, higher than the predetermined output) (step S22: Yes), the ECU 30 determines whether or not there is the failure of the switching valve 13 which is closed on the basis of the increasing tendency of the engine water temperature thw. In other words, the ECU 30 determines whether or not there is the failure of the switching valve 13 which is closed by performing the above described first determining operation (step S12 to step S17).

However, even if it is determined that the output of the engine 20 is relatively high (alternatively, higher than the predetermined output), the ECU 30 may determine whether or not there is the failure of the switching valve 13 which is closed on the basis of the difference ΔTsens between the engine water temperature thw and the bypass water temperature thb, in addition to or instead of the increasing tendency of the engine water temperature thw.

On the other hand, as a result of the determination at the step S22, if it is determined that the output of the engine 20 is not relatively high (alternatively, not higher than the predetermined output) (step S22: No), the ECU 30 determines whether or not there is the failure of the switching valve 13 which is closed on the basis of the difference ΔTsens between the engine water temperature thw and the bypass water temperature thb (step S23 to step S24). Specifically, the ECU 30 calculates the difference ΔTsens between the engine water temperature thw and the bypass water temperature thb (step S23). Then, the ECU 30 determines whether or not the difference ΔTsens which is calculated at the step S23 is larger than the threshold value for the determination (step S24).

Incidentally, a value which is capable of appropriately determining whether or not there is the failure of the switching valve 13 which is closed is preferably used as the threshold value for the determination. This threshold value for the determination may be set in advance by an experiment, a simulation or the like based on the relationship between the "the difference ΔTsens between the engine water temperature thw and the bypass water temperature thb" and the "existence/non-existence of the failure of the switching valve 13" which is illustrated in FIG. 9.

As a result of the determination at the step S24, if it is determined that the difference ΔTsens is larger than the threshold value for the determination (step S24: Yes), the ECU 30 determines that there is the failure of the switching valve 13 which is closed (step S17).

On the other hand, as a result of the determination at the step S24, if it is determined that the difference ΔTsens is not larger than the threshold value for the determination (step S24: No), the ECU 30 determines that there is not the failure of the switching valve 13 which is closed (step S15)

Incidentally, in the above described explanation, the ECU 30 determines whether or not there is the failure of the switching valve 13 which is closed on the basis of the difference ΔTsens between the engine water temperature thw and the bypass water temperature thb. However, the ECU 30 may determine whether or not there is the failure of the switching valve 13 which is closed, by determining whether or not an integrated value of the difference ΔTsens or a variation amount of the difference ΔTsens per unit time is larger than the predetermined threshold value for the determination. In this case, the ECU 30 may determine that there is the failure of the switching valve 13 which is closed, if it is determined that the integrated value of the difference ΔTsens or the variation amount of the difference ΔTsens per unit time is larger than the predetermined threshold value for the determination.

As described above, according to the second determining operation, the ECU 30 is capable of determining whether or not there is the failure of the switching valve 13 which is closed on the basis of the increasing tendency of the engine water temperature thw. Therefore, even in the second determining operation, the effect which can be achieved by performing the first determining operation can be achieved.

Moreover, in the second determining operation, the ECU 30 considers the factor which affects the accuracy of the operation of determining whether or not there is the failure of the switching valve 13 which is closed, and selects, as the specific method of determining whether or not there is the failure of the switching valve 13 which is closed, either one of the "determining operation based on the increasing tendency of the engine water temperature thw" and the "determining operation based on the difference ΔTsens". Therefore, the ECU 30 is capable of determining whether or not there is the failure of the switching valve 13 which is closed more accurately.

The present invention is not limited to the aforementioned embodiments, but various changes may be made, if desired, without departing from the essence or spirit of the invention which can be read from the claims and the entire specification. A cooling water control apparatus, which involves such changes, is also intended to be within the technical scope of the present invention.

REFERENCE SIGNS LIST 1 vehicle
10 cooling apparatus
11 exhaust heat recovery equipment
12 heater core
13 switching valve
14 radiator
15 thermostat
16 electric WP
17b, 17w water temperature sensor
18 cooling water pipe
18a cooling water pipe
18b cooling water pipe
181a cooling water pipe
181b cooling water pipe
181c cooling water pipe
181d cooling water pipe
182a cooling water pipe
182b cooling water pipe
182c cooling water pipe
182d cooling water pipe
183a cooling water pipe
183b cooling water pipe
20 engine
30 ECU

The invention claimed is:

1. A cooling water control apparatus for controlling a cooling apparatus,
the cooling apparatus being provided with:
(i) a first pipe which circulates a cooling water and which passes through an inside of an engine;
(ii) a second pipe which circulates the cooling water and which does not pass through the inside of the engine; and
(iii) a switching valve which is disposed at a downstream side of the engine, a state of the switching valve being changed between an opened state and a closed state in accordance with a command, the opened state allowing a first flow amount of cooling water to flow from the first pipe to the second pipe, the closed state allowing a second flow amount of cooling water to flow from the first pipe to the second pipe, the second flow amount being less than the first flow amount,
the cooling water control apparatus comprising a controller,
the controller being programmed to:
detect a first temperature of the cooling water in a pipe portion of the first pipe, the pipe portion being located between the engine and the switching valve; and
determine that there is a failure of the switching valve that is in the closed state, when a required time period is larger than a determination period, wherein the required time period is the time period from the output of the command for changing the state of the switching valve from the opened state to the closed state until the first temperature reaches a determination temperature, the determination temperature is higher than the first temperature, as it was measured at the time of the output of the command for changing the state of the switching valve from the opened state to the closed state,
the switching valve being provided with:
(i) a valve portion, wherein the valve portion opens a passage between the first and second pipes such that the first flow amount of the cooling water flows from the first pipe to the second pipe when the state of the switching valve is the opened state and the valve portion closes the passage between the first and second pipes when the state of the switching valve is the closed state; and
(ii) a micro flowing portion which allows the second flow amount of the cooling water to flow from the first pipe to the second pipe when the state of the switching valve is the closed state,
the controller being programmed to determine that there is a failure of the micro flowing portion, when the required time period is larger than the determination period.

2. The cooling water control apparatus according to claim 1, wherein
the controller is programmed to determine whether or not there is the failure of the switching valve that is in the closed state on the basis of whether or not the required time period is larger than the determination period, when a predetermined time does not lapse after the engine starts to operate,
the controller is programmed to determine whether or not there is the failure of the switching valve that is in the closed state on the basis of a difference between the first temperature and a second temperature of the cooling water in the second pipe, when the predetermined time lapses after the engine starts to operate.

3. The cooling water control apparatus according to claim 2, wherein
The controller is programmed to determine that there is the failure of the switching valve that is in the closed state, when the difference is larger than a predetermined threshold value.

* * * * *